(12) United States Patent
Koiso

(10) Patent No.: US 11,363,211 B2
(45) Date of Patent: Jun. 14, 2022

(54) IMAGE GENERATION CONTROL DEVICE, IMAGE GENERATION CONTROL METHOD, AND IMAGE GENERATION CONTROL PROGRAM

(71) Applicant: JVCKENWOOD Corporation, Yokohama (JP)

(72) Inventor: Hisashi Koiso, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/785,151

(22) Filed: Feb. 7, 2020

(65) Prior Publication Data

US 2020/0177785 A1    Jun. 4, 2020

Related U.S. Application Data

(63) Continuation of application No. PCT/JP2018/010945, filed on Mar. 20, 2018.

(30) Foreign Application Priority Data

Aug. 29, 2017  (JP) .............................. JP2017-164061

(51) Int. Cl.
*H04N 5/235*      (2006.01)
(52) U.S. Cl.
CPC ......... *H04N 5/2352* (2013.01); *H04N 5/2351* (2013.01); *H04N 5/2357* (2013.01)
(58) Field of Classification Search
CPC .. H04N 5/2352; H04N 5/2351; H04N 5/2357; H04N 5/23229; H04N 5/2354;
(Continued)

(56) References Cited

U.S. PATENT DOCUMENTS 7,590,348 B2 * 9/2009 Usui ...................... H04N 5/235
                                                    348/218.1
7,760,237 B2 * 7/2010 Usui .................. H04N 5/23248
                                                    348/208.99
(Continued)

FOREIGN PATENT DOCUMENTS

JP      2001-043383 A    2/2001
JP      2002-204391 A    7/2002
(Continued)

OTHER PUBLICATIONS

JP-2007251258-A Machine Translation (Year: 2007).*

*Primary Examiner* — Jason A Flohre
(74) *Attorney, Agent, or Firm* — Procopio, Cory Hargreaves & Savitch LLP

(57) ABSTRACT

Provided are an image generation control device, an image generation control method, and an image generation control program that are capable of generating an image of an object to be imaged positioned in a vicinity of an imaging-hindering light source with high precision. In an image generation control device, based on luminance variation within a target area including the imaging-hindering light source and the object to be imaged, a calculation unit calculates an expected light-off period during which the imaging-hindering light source is turned off. An image-capturing control unit, by setting an exposure period of an image-capturing unit within the expected light-off period calculated by the calculation unit, makes the image-capturing unit capture an image including the target area within the expected light-off period.

7 Claims, 8 Drawing Sheets

(58) Field of Classification Search
CPC ...... H04N 5/2353; H04N 5/225; H04N 5/232; H04N 5/235; B60Q 1/00; G03B 7/093; G03B 15/00; G03B 15/03; G03B 15/05
See application file for complete search history.

(56) References Cited

U.S. PATENT DOCUMENTS

| | | | |
|---|---|---|---|
| 10,293,749 B2* | 5/2019 | Saito | G01S 13/867 |
| 2002/0047909 A1 | 4/2002 | Hatae et al. | |
| 2006/0028554 A1* | 2/2006 | Usui | H04N 5/23254 |
| | | | 348/208.99 |
| 2007/0153086 A1* | 7/2007 | Usui | H04N 5/235 |
| | | | 348/153 |
| 2013/0202202 A1* | 8/2013 | Hasu | G06T 5/50 |
| | | | 382/166 |
| 2013/0258134 A1 | 10/2013 | Ashida et al. | |
| 2015/0002015 A1* | 1/2015 | Hayakawa | B60Q 1/08 |
| | | | 315/82 |
| 2017/0313250 A1* | 11/2017 | Fischer | H04N 5/235 |
| 2018/0048801 A1* | 2/2018 | Kiser | H04N 5/23238 |
| 2018/0227475 A1* | 8/2018 | Kishimoto | G06T 7/514 |

FOREIGN PATENT DOCUMENTS

| | | | |
|---|---|---|---|
| JP | 2007-251258 A | | 9/2007 |
| JP | 2007251258 A | * | 9/2007 |
| JP | 2011-227657 A | | 11/2011 |
| JP | 2016-196233 A | | 11/2016 |
| WO | 2012/073657 A1 | | 6/2012 |

* cited by examiner

IMAGE GENERATION CONTROL DEVICE, IMAGE GENERATION CONTROL METHOD, AND IMAGE GENERATION CONTROL PROGRAM

CROSS REFERENCE TO RELATED APPLICATION

This application is a Bypass Continuation of International Application No. PCT/JP2018/010945 filed on Mar. 20, 2018, which is based upon and claims the benefit of priority from Japanese Patent Application No. 2017-164061 filed on Aug. 29, 2017, the disclosure of which is incorporated herein in its entirety by reference.

BACKGROUND

The present invention relates to an image generation control device, an image generation control method, and an image generation control program.

Conventionally, technologies of dividing a captured image into a plurality of divided regions, detecting a flicker flickering on and off with respect to each divided region, considering a divided region where a flicker is detected as a light emitting diode (LED) region, and performing white balance adjustment on the LED region have been proposed (for example, International Patent Publication No. WO 2012/073657).

For example, in a road traffic monitoring system or the like, images of license plates of traveling vehicles are sometimes captured by image-capturing devices as "objects to be imaged". Headlights are generally arranged in a vicinity of a license plate, and LEDs are sometimes used for such headlights.

However, when headlights serve as backlight for the image-capturing device, there is a possibility that it becomes difficult to capture an image of a license plate with high precision. This problem applies to not only headlights and a license plate but also another type of imaging-hindering light source and an object to be imaged positioned in a vicinity of the imaging-hindering light source.

SUMMARY

An image generation control device according to one aspect of the present embodiment is an image generation control device configured to generate an image of an object to be imaged positioned in a vicinity of an imaging-hindering light source flickering on and off cyclically and includes a calculation unit configured to calculate, based on luminance variation within a target area including the imaging-hindering light source and the object to be imaged, an expected light-off period during which the imaging-hindering light source is turned off and an image-capturing control unit configured to, by setting an exposure period of an image-capturing unit within the calculated expected light-off period, make the image-capturing unit capture an image including the target area within the calculated expected light-off period.

An image generation control method according to another aspect of the present embodiment is an image generation control method configured to generate an image of an object to be imaged positioned in a vicinity of an imaging-hindering light source flickering on and off cyclically and includes calculating, based on luminance variation within a target area including the imaging-hindering light source and the object to be imaged, an expected light-off period during which the imaging-hindering light source is turned off and, by setting an exposure period of an image-capturing unit within the calculated expected light-off period, making the image-capturing unit capture an image including the target area within the calculated expected light-off period.

An image generation control program according to still another aspect of the present embodiment is an image generation control program causing an image generation control device configured to generate an image of an object to be imaged positioned in a vicinity of an imaging-hindering light source flickering on and off cyclically to execute processing including calculating, based on luminance variation within a target area including the imaging-hindering light source and the object to be imaged, an expected light-off period during which the imaging-hindering light source is turned off and, by setting an exposure period of an image-capturing unit within the calculated expected light-off period, making the image-capturing unit capture an image including the target area within the calculated expected light-off period.

DETAILED DESCRIPTION

Hereinafter, embodiments of the present invention will be described with reference to the drawings. Note that, in the following embodiments, the same signs are assigned to the same or equivalent components and overlapping descriptions will be omitted.

First Embodiment

Configuration Example of Image Generation Control Device

Figure 1:
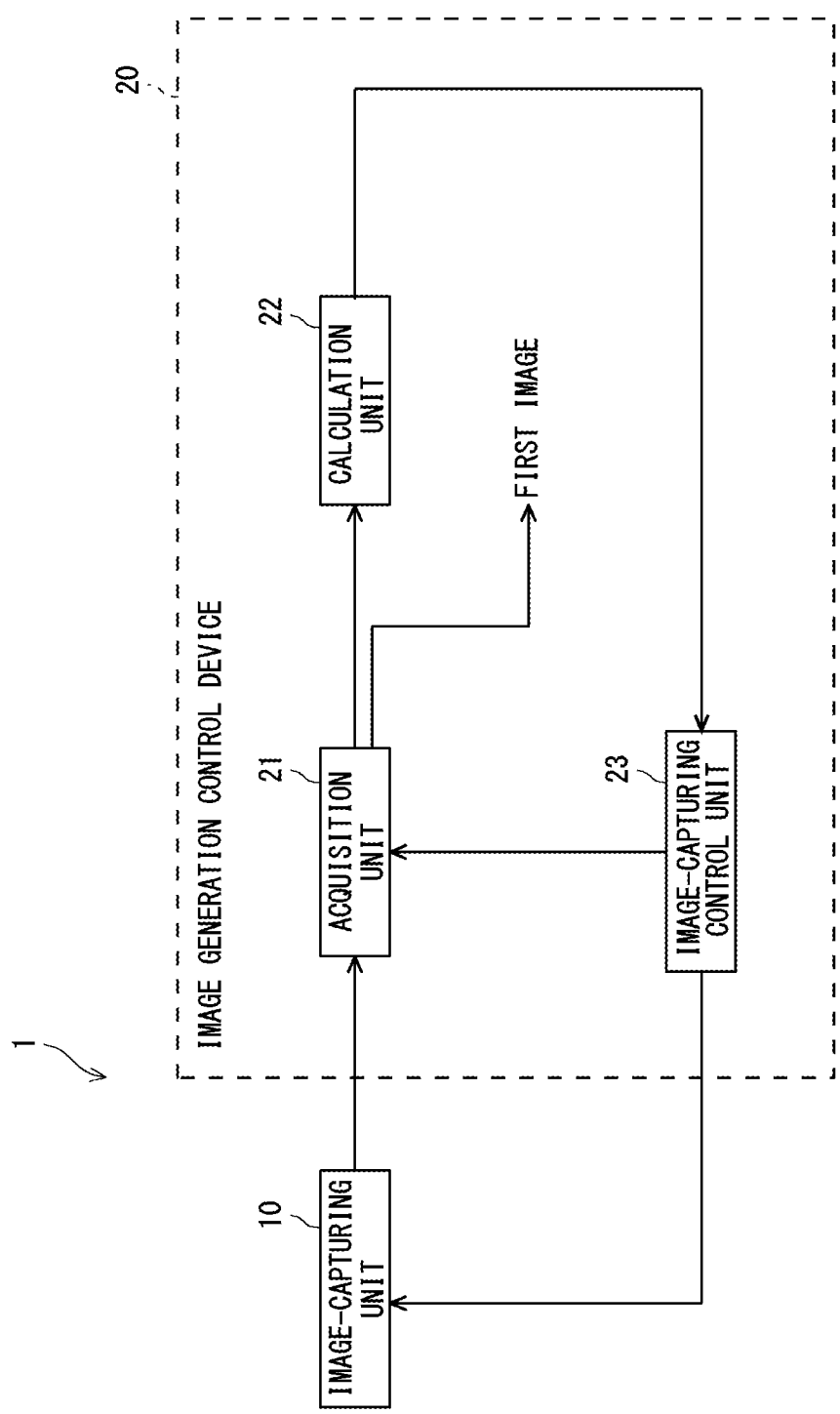
FIG. 1 is a block diagram illustrating an example of an image-capturing apparatus including an image generation control device of a first embodiment.

FIG. 1 is a block diagram illustrating an example of an image-capturing apparatus including an image generation control device of a first embodiment. In FIG. 1, an image-capturing apparatus 1 includes an image-capturing unit 10 and an image generation control device 20.

The image-capturing unit 10 captures images, based on image-capturing settings (for example, an imaging frame rate) that are set by the image generation control device 20. The image-capturing unit 10 includes, for example, an image pickup device. Examples of the image pickup device include charge coupled devices (CCD) and a complementary metal oxide semiconductor (CMOS).

The image generation control device 20 is a device configured to generate images of an object to be imaged that is positioned in a vicinity of an imaging-hindering light source flickering on and off cyclically. The following description will be made assuming that, as an example, the imaging-hindering light source flickering on and off cyclically is LEDs used in the headlights of a vehicle and the object to be imaged is a license plate.

In FIG. 1, the image generation control device 20 includes an acquisition unit 21, a calculation unit 22, and an image-capturing control unit 23.

The acquisition unit 21 acquires captured images captured by the image-capturing unit 10, in accordance with control by the image-capturing control unit 23.

The calculation unit 22 receives target area images (hereinafter, sometimes referred to as "second images") including a "target area" from the acquisition unit 21, the target area images being captured in a plurality of captured frames by the image-capturing unit 10 when a set value of the imaging frame rate is a "first set value". Based on luminance variation among a plurality of received second images, the calculation unit 22 calculates an "expected light-off period" during which the imaging-hindering light source is turned off. In the plurality of second images, luminance is high when the imaging-hindering light source is turned on and is low when turned off. The calculation unit 22 detects that such variation in the luminance is repeated among the plurality of images and calculates an "expected light-off period". That is, the "expected light-off period" is a period corresponding to an "off state" of the imaging-hindering light source, which flickers on and off cyclically. As used herein, a "target area" is an area including the imaging-hindering light source (that is, the headlights) and the object to be imaged (that is, the license plate). In addition, a "first set value" is required to be set higher than a flicker rate of the imaging-hindering light source.

The image-capturing control unit 23 sets the above-described image-capturing conditions to the image-capturing unit 10. That is, the above-described "first set value" is also set by the image-capturing control unit 23. In addition, the image-capturing control unit 23, by setting an exposure period (exposed period) of the image-capturing unit 10 within the expected light-off period calculated by the calculation unit 22, makes the image-capturing unit 10 capture a target area image (hereinafter, sometimes referred to as a "first image") including the target area within the expected light-off period. Note that the image-capturing control unit 23 may adjust a set value of the imaging frame rate, to be set to the image-capturing unit 10, into a "second set value" when making the image-capturing unit 10 capture a first image. For example, the "second set value" corresponds to an imaging frame rate lower than the above-described "first set value". The first image is acquired by the acquisition unit 21 in accordance with control by the image-capturing control unit 23.

As described above, according to the first embodiment, in the image generation control device 20, the calculation unit 22 calculates an "expected light-off period" during which the imaging-hindering light source is turned off, and the image-capturing control unit 23, by setting an exposure period of the image-capturing unit 10 within the expected light-off period calculated by the calculation unit 22, makes the image-capturing unit 10 capture a "first image" including a target area within the expected light-off period. That is, the image generation control device 20 can also be referred to as an image-capturing control device.

Since the configuration of the image generation control device 20 enables a first image captured within a light-off period of an imaging-hindering light source to be acquired, it is possible to generate an image of an object to be imaged positioned in a vicinity of the imaging-hindering light source with high precision even when the imaging-hindering light source serves as backlight for the image-capturing unit 10. Note that the acquired first image may be directly used for image generation of the object to be imaged or may be used for identification of a position of the object to be imaged as in, for example, a second embodiment to be described later.

Second Embodiment

The second embodiment relates to a more specific embodiment.

Configuration Example of Image Generation Control Device

Figure 2:
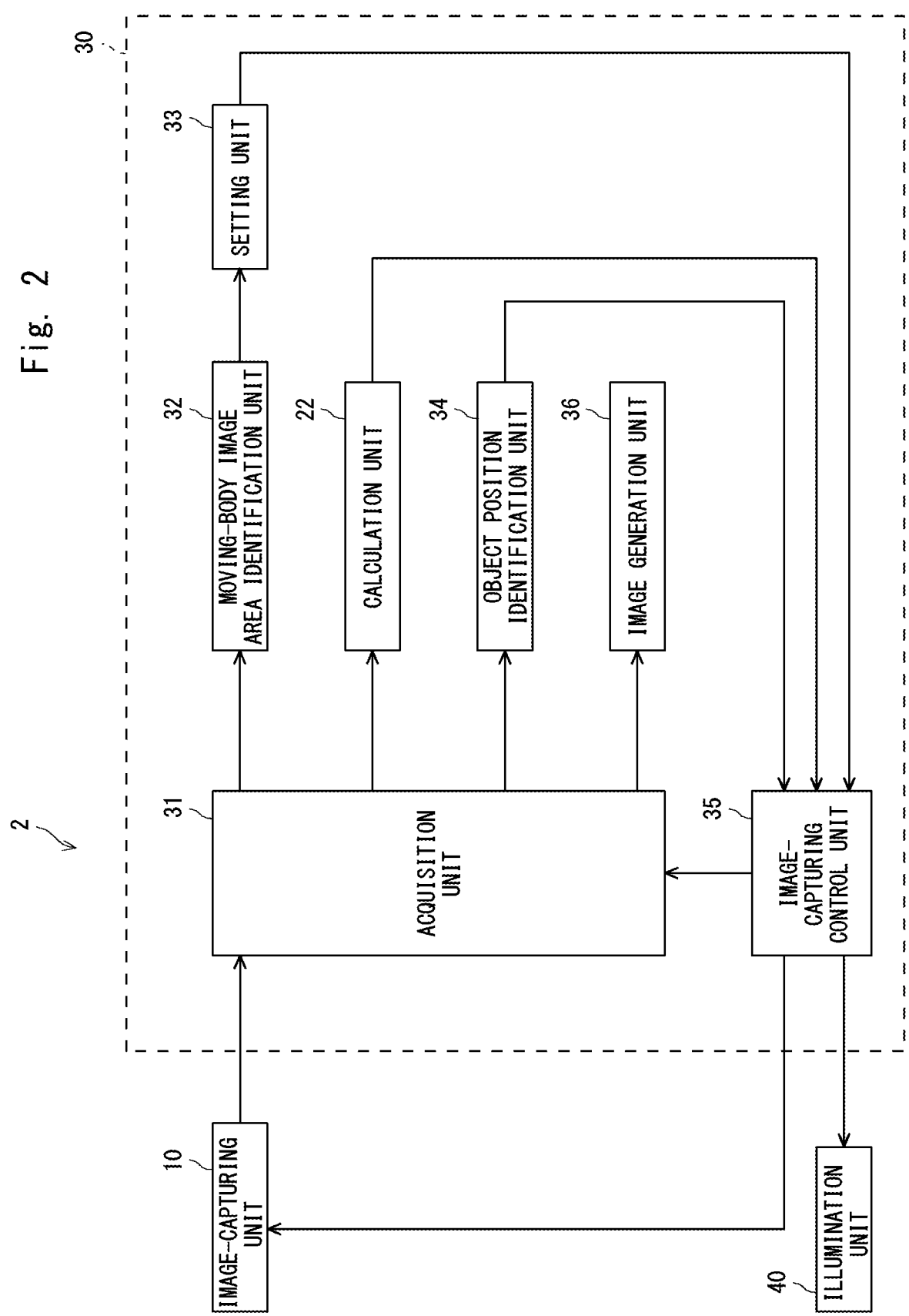
FIG. 2 is a block diagram illustrating an example of an image-capturing apparatus including an image generation control device of a second embodiment.

FIG. 2 is a block diagram illustrating an example of an image-capturing apparatus including an image generation control device of the second embodiment. In FIG. 2, an image-capturing apparatus 2 includes an image-capturing unit 10, an image generation control device 30, and an illumination unit 40.

The image-capturing unit 10 of the second embodiment, as with the first embodiment, captures images, based on image-capturing settings (for example, an imaging frame rate) that are set by the image generation control device 30.

As illustrated in FIG. 2, the image generation control device 30 includes an acquisition unit 31, a moving-body image area identification unit 32, a setting unit 33, an object position identification unit 34, an image-capturing control unit 35, and an image generation unit 36.

The acquisition unit 31 acquires "wide area images" captured by the image-capturing unit 10, in accordance with control by the image-capturing control unit 35 and outputs the acquired wide area images to the moving-body image area identification unit 32 and the image generation unit 36. As used herein, a "wide area image" is an image that includes a target area and the area of which is wider than the target area. That is, for example, while a "wide area image" is, for example, an image acquired from the whole elements of the image-capturing unit 10, a "target area image" is an image acquired from pixels corresponding to elements within the target area among the whole elements of the image-capturing unit 10. Note that, as will be described later, in a "target area identification processing period", a "third set value" that corresponds to an imaging frame rate lower than the above-described "first set value" may be set to the image-capturing unit 10 by the image-capturing control unit 35.

In addition, the acquisition unit 31 acquires "target area images (that is, second images)" captured by the image-capturing unit 10, in accordance with control by the image-capturing control unit 35 and outputs the acquired second images to a calculation unit 22. Note that, when the second images are acquired, the above-described "first set value" is set to the image-capturing unit 10 by the image-capturing control unit 35.

In addition, the acquisition unit 31 acquires a "target area image (that is, a first image)" captured by the image-capturing unit 10, in accordance with control by the image-capturing control unit 35 and outputs the acquired first image to the object position identification unit 34. Note that, when the first image is acquired, an exposure period of the image-capturing unit 10 is set within an expected light-off period calculated by the calculation unit 22. In addition, when the first image is acquired, the above-described "second set value" may be set to the image-capturing unit 10 by the image-capturing control unit 35.

In addition, the acquisition unit 31 acquires an "object-to-be-imaged image" captured by the image-capturing unit 10, in accordance with control by the image-capturing control unit 35 and outputs the acquired object-to-be-imaged image to the image generation unit 36. An "object-to-be-imaged image" is an image that is acquired from pixels corresponding to elements within an area of an object to be imaged among the whole elements of the image-capturing unit 10 and the area of which is smaller than that of a "target area image".

The moving-body image area identification unit 32, using a plurality of wide area images acquired from the image-capturing unit 10 via the acquisition unit 31, identifies an image area corresponding to at least a portion of a moving object and outputs the identified image area to the setting unit 33. For example, the moving-body image area identification unit 32 identifies an image area in which the shape of a moving body is substantially the same but the position thereof changes among a plurality of wide area images. Examples of such an image area to be identified include an image area corresponding to a vehicle onto which a license plate, which is an object to be imaged, is attached and an image area including two headlights, which are respectively arranged at the right and left sides of a vehicle, at the right and left ends thereof.

The setting unit 33 sets an image area identified by the moving-body image area identification unit 32 as a "target area". As described above, the "target area" includes an imaging-hindering light source and an object to be imaged.

The object position identification unit 34, using a first image acquired from the image-capturing unit 10 via the acquisition unit 31, identifies a position of an object to be imaged.

The image-capturing control unit 35 sets a "third set value" that corresponds to an imaging frame rate lower than the "first set value" to the image-capturing unit 10 and makes the image-capturing unit 10 output "wide area images".

In addition, the image-capturing control unit 35 sets the "first set value" to the image-capturing unit 10 and makes the image-capturing unit 10 output second images.

In addition, the image-capturing control unit 35 sets the above-described "second set value" to the image-capturing unit 10 and, in conjunction therewith, sets an exposure period of the image-capturing unit 10 within an expected light-off period calculated by the calculation unit 22 and makes the image-capturing unit 10 output a first image.

In addition, the image-capturing control unit 35 sets the above-described "second set value" to the image-capturing unit 10 and, in conjunction therewith, sets an exposure period of the image-capturing unit 10 within an expected light-off period calculated by the calculation unit 22 and further makes the illumination unit 40 radiate illuminating light toward a position of an object to be imaged identified by the object position identification unit 34 at a timing synchronized with the exposure period of the image-capturing unit 10. The image-capturing control unit 35 makes the image-capturing unit 10 output an image of the position of the object to be imaged, which is irradiated with the illuminating light from the illumination unit 40.

The image generation unit 36 synthesizes an image of an object to be imaged received from the acquisition unit 31 and a wide area image received from the acquisition unit 31 with each other and thereby generates a synthetic image.

The illumination unit 40 radiates illuminating light toward a position of an object to be imaged identified by the object position identification unit 34 at a timing synchronized with an exposure period of the image-capturing unit 10, in accordance with control by the image-capturing control unit 35.

Operation Example of Image Generation Control Device

Figure 3:
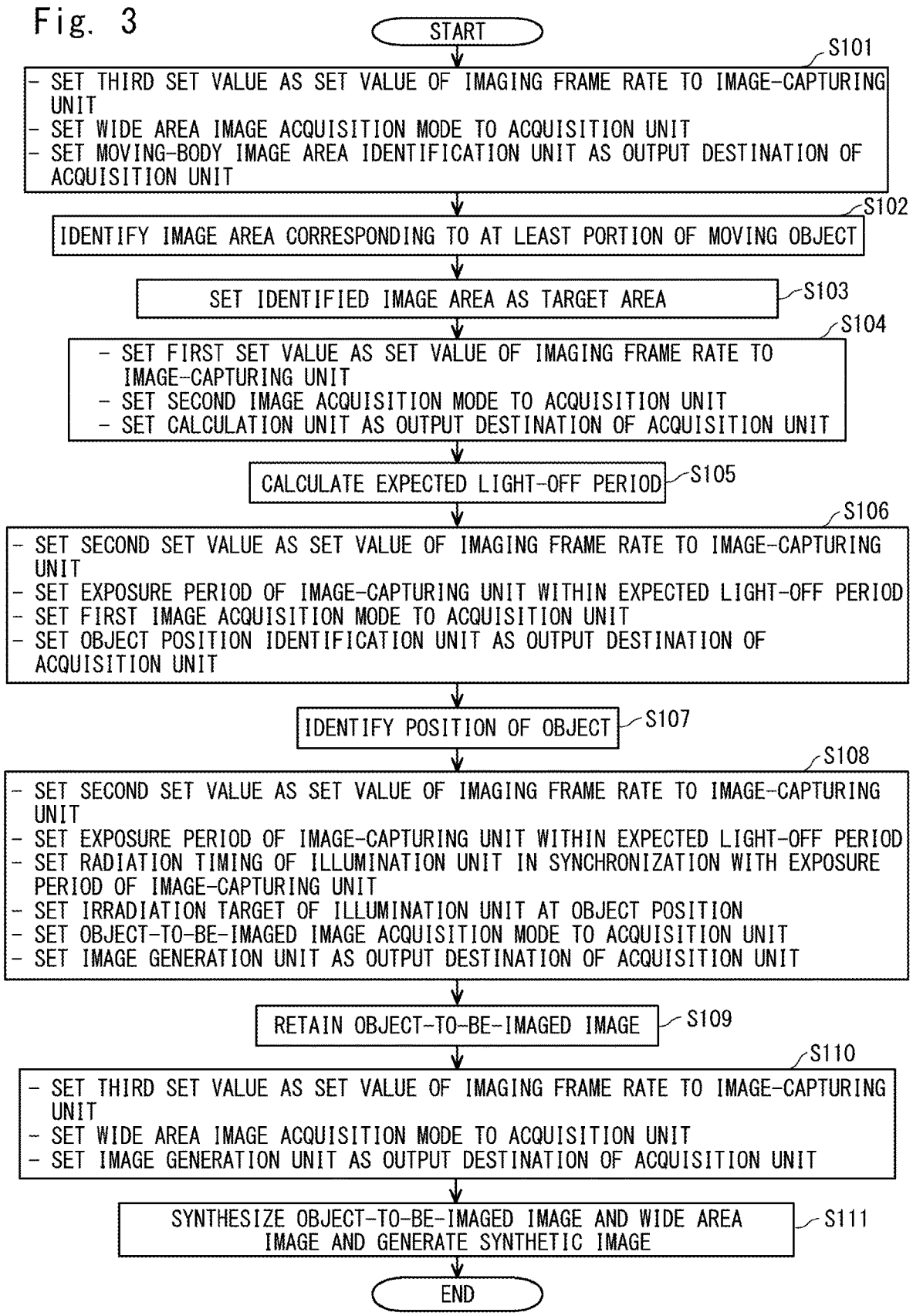
FIG. 3 is a flowchart illustrating an example of processing operation of the image generation control device of the second embodiment.
Figure 4:
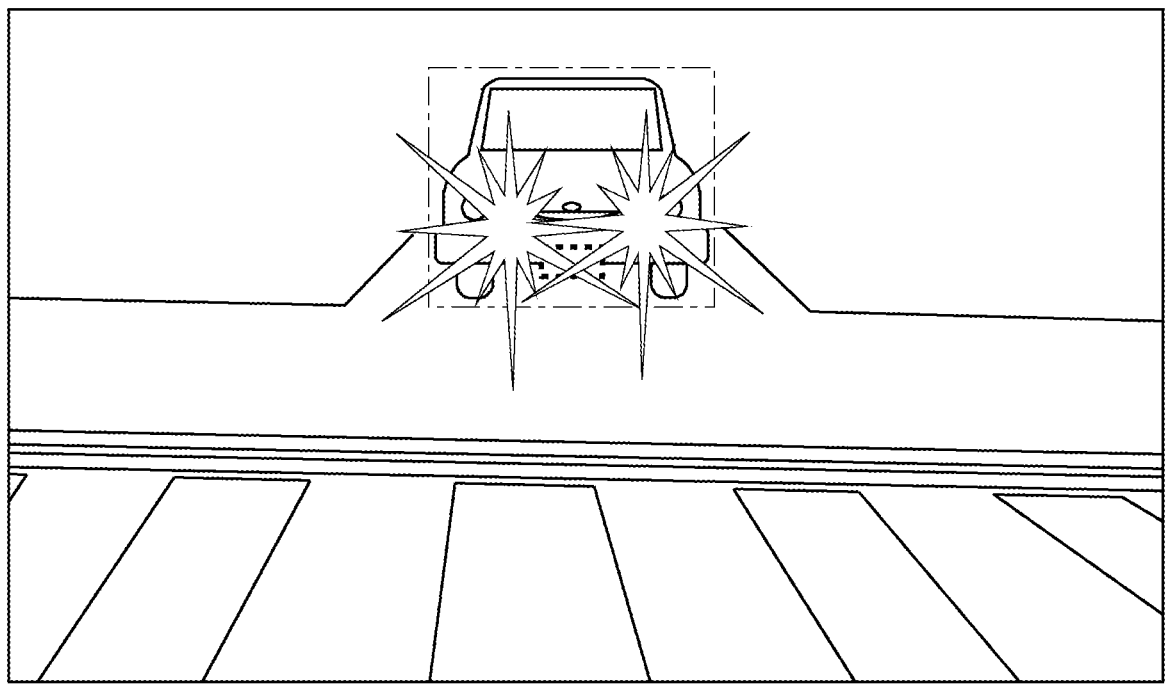
FIG. 4 is a diagram provided for description of a wide area image and a target area image.
Figure 5:
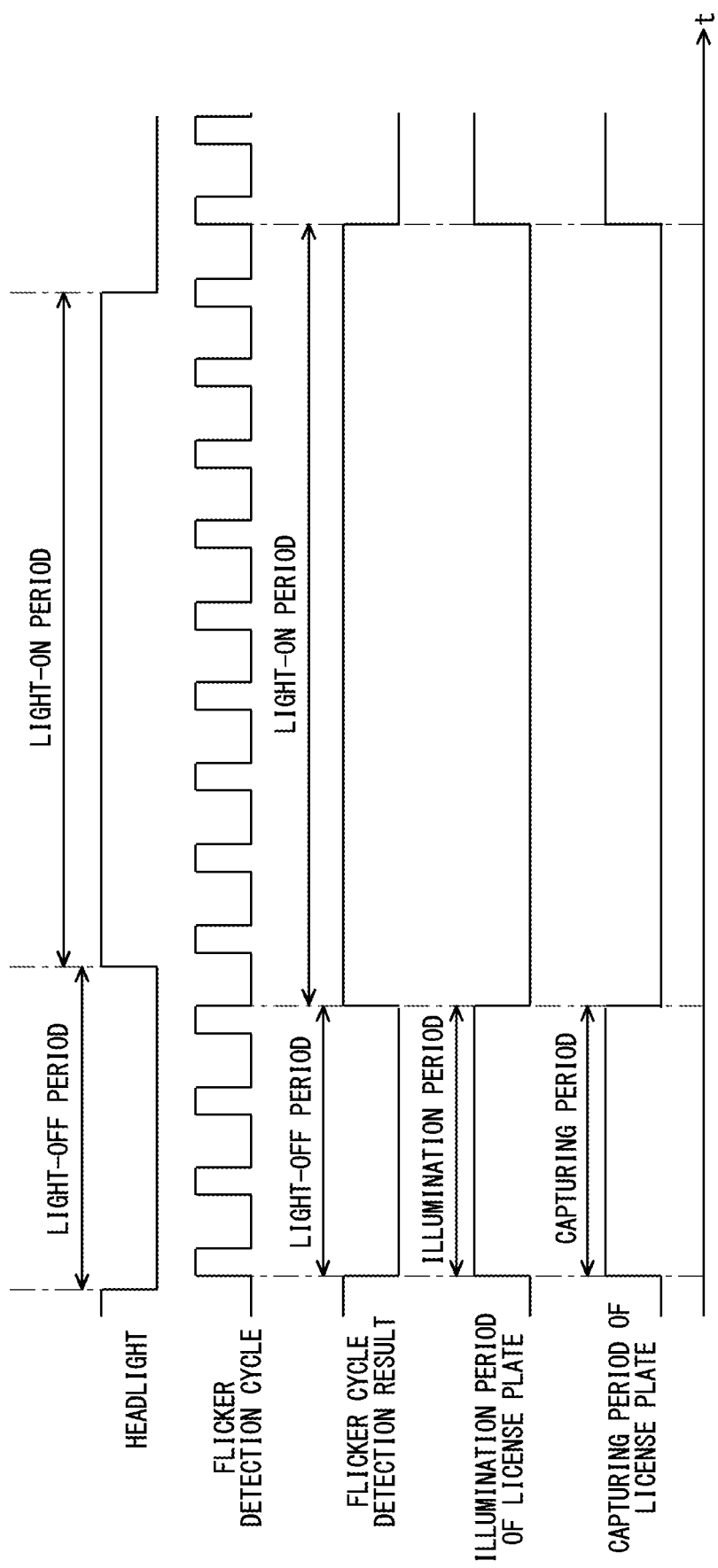
FIG. 5 is a diagram provided for description of the processing operation of the image generation control device.

An example of processing operation of the image generation control device having the configuration having been described thus far will be described. FIG. 3 is a flowchart illustrating an example of processing operation of the image generation control device of the second embodiment. FIG. 4 is a diagram provided for description of a wide area image and a target area image. FIG. 5 is a diagram provided for description of the processing operation of the image generation control device.

<Identification Processing of Target Area>

The image-capturing control unit 35 sets the third set value as a set value of the imaging frame rate to the image-capturing unit 10 and sets, to the acquisition unit 31, a "wide area image acquisition mode" as an acquisition mode and, in conjunction therewith, the moving-body image area identification unit 32 as an output destination (step S101).

The setting in step S101 enables the moving-body image area identification unit 32 to acquire a plurality of wide area images. For example, the whole image illustrated in FIG. 4 is a wide area image. In addition, for example, the third set value is 30 fps.

Next, the moving-body image area identification unit 32, using the plurality of acquired wide area images, identifies an image area corresponding to at least a portion of a moving object (step S102). Next, the setting unit 33 sets the image area identified in step S102 as a target area (step S103). The set target area is notified to the image-capturing control unit 35. For example, an area enclosed by a rectangular frame drawn by an alternate long and short dash line, illustrated in FIG. 4, is a target area. In the example, an area occupied by an image of a vehicle approaching the image-capturing unit 10 from a distant place in the capturing direction of the image-capturing unit 10 is set as a target area. Since the headlights of the vehicle serve as backlight for the image-capturing unit 10, there is a possibility that the headlights become a hindrance for image capturing of the license plate.

<Calculation Processing of Expected Light-Off Period>

Next, the image-capturing control unit 35 sets the first set value as a set value of the imaging frame rate to the image-capturing unit 10 and sets, to the acquisition unit 31, a "second image acquisition mode" as an acquisition mode and, in conjunction therewith, the calculation unit 22 as an output destination (step S104). The setting in step S104 enables the calculation unit 22 to acquire a plurality of second images. The first set value is required to be set higher than a flicker rate of the imaging-hindering light source. For example, the first set value is a high-speed frame rate, such as 20000 fps, which is a value higher than the third set value.

Next, based on the plurality of acquired second images, the calculation unit 22 calculates an "expected light-off period" during which the imaging-hindering light source is turned off (step S105). In the top row in FIG. 5, an example of a timing chart relating to flicker of the headlights, which are the imaging-hindering light source, is illustrated. In the second row from the top in FIG. 5, an image-capturing control signal stream when the set value of the imaging frame rate is set at the first set value is illustrated. Each pulse included in the image-capturing control signal stream corresponds to one round of image capturing and, through such one round of image capturing, one second image is captured. That is, the inverse of a time interval between two rising portions of two preceding and succeeding consecutive pulses (that is, a flicker detection cycle) corresponds to an imaging frame rate. When the sum totals of luminance of respective second images are equal to or greater than a determination threshold value Th, the calculation unit 22 determines that a flicker detection cycle corresponding to the second images is a portion of a light-on period of the imaging-hindering light source. On the other hand, when the sum totals of luminance of respective second images are less than the determination threshold value Th, the calculation unit 22 determines that a flicker detection cycle corresponding to the second images is a portion of a light-off period of the imaging-hindering light source. Since the imaging-hindering light source flickers on and off cyclically at, for example, 10 kHz, use of a plurality of second images captured during a period longer than the flicker cycle enables a light-on period and a light-off period of the imaging-hindering light source in each flicker cycle to be identified, as illustrated in the diagram in the third row from the top in FIG. 5. As a result, the calculation unit 22 is able to calculate an expected light-on period and an expected light-off period.

In the above processing, the target of the calculation processing of an expected light-off period is set at, instead of the whole of a wide area image, an image of a target area that is a portion of the wide area image. This configuration enables a load of the image processing to be reduced. In addition, since it is sufficient to be able to detect a change in brightness in the target area, the second images may only be monochromatic images and the exposure period can be shortened. Thus, even when the flicker cycle is short, it is possible to adjust speed of data transfer and speed of calculation processing to the flicker cycle.

<Identification Processing of Object Position>

Next, the image-capturing control unit 35 sets the second set value as a set value of the imaging frame rate to the image-capturing unit 10 and, in conjunction therewith, sets the exposure period of the image-capturing unit 10 within the expected light-off period (step S106). Further, the image-capturing control unit 35 sets, to the acquisition unit 31, a "first image acquisition mode" as an acquisition mode and, in conjunction therewith, the object position identification unit 34 as an output destination (step S106). That is, with regard to the acquisition mode of the acquisition unit 31, the settings in step S104 are retained. The setting in step S106 enables the object position identification unit 34 to acquire at least one first image. Note that the second set value is, as described above, a value lower than the first set value and may be, for example, a value corresponding to the flicker cycle of the imaging-hindering light source or a value corresponding to a natural number multiple of the flicker cycle. This configuration enables image capturing to be surely performed within an expected light-off period.

Next, the object position identification unit 34, using the acquired first image, identifies a position of the object to be imaged (step S107). When the object to be imaged is a license plate, it is possible to identify an approximate position of the object to be imaged by means of, for example, pattern matching because the shape and size of a license plate are standardized.

<Acquisition Processing of Object Image>

Next, the image-capturing control unit 35 sets the second set value as a set value of the imaging frame rate to the image-capturing unit 10 and, in conjunction therewith, sets the exposure period of the image-capturing unit 10 within the expected light-off period (step S108). That is, with regard to the imaging frame rate and exposure period of the image-capturing unit 10, the settings in step S106 are retained. In addition, the image-capturing control unit 35 sets a radiation timing of the illumination unit 40 in synchronization with the exposure period of the image-capturing unit 10 and, in conjunction therewith, sets an irradiation target of the illumination unit 40 at the object position (step S108). Further, the image-capturing control unit 35 sets, to the acquisition unit 31, an "object-to-be-imaged image acquisition mode" as an acquisition mode and, in conjunction therewith, the image generation unit 36 as an output destination (step S108). The setting in step S108 enables the image generation unit 36 to acquire an image of the object to be imaged, which is irradiated by light radiated from the illumination unit 40. Note that, although, in the diagram in the fourth row from the top in FIG. 5, a case where the illumination unit 40 radiates light during the whole duration of the calculated expected light-off period is illustrated, the present embodiment is not limited to the case and the illumination unit 40 may radiate light during a portion of the expected light-off period. In addition, although, in the diagram in the bottom row in FIG. 5, a case where the whole duration of the calculated expected light-off period coincides with the exposure period of the image-capturing unit 10 is illustrated, the present embodiment is not limited to the case and a portion of the expected light-off period may coincide with the exposure period of the image-capturing unit 10.

Next, the image generation unit 36 retains the acquired object-to-be-imaged image (step S109).

<Generation Processing of Synthetic Image>

Next, the image-capturing control unit 35 sets the third set value as a set value of the imaging frame rate to the image-capturing unit 10 and sets, to the acquisition unit 31, the "wide area image acquisition mode" as an acquisition mode and, in conjunction therewith, the image generation unit 36 as an output destination (step S110). The setting in step S110 enables the image generation unit 36 to acquire a wide area image.

Next, the image generation unit 36 synthesizes the acquired wide area image and the retained object-to-be-imaged image with each other and generates a synthetic image (step S111). For example, the image generation unit 36 may generate a synthetic image by superimposing the object-to-be-imaged image at the position of the object to be imaged in the wide area image, that is, by replacing an image at the position of the object to be imaged in the wide area image with the object-to-be-imaged image.

As described thus far, according to the second embodiment, in the image generation control device 30, the moving-body image area identification unit 32, using a plurality of wide area images captured in a plurality of captured frames by the image-capturing unit 10, identifies an image area corresponding to at least a portion of a moving object. The setting unit 33 sets a target area, based on the identified image area.

Since the configuration of the image generation control device 30 enables a target of the calculation processing of an expected light-off period to be set at, instead of the whole of a wide area image, an image of a target area that is a portion of the wide area image, it is possible to reduce a processing load and to adjust speed of data transfer and speed of calculation processing to the flicker cycle even when the flicker cycle is short.

In addition, in the image generation control device 30, the object position identification unit 34, using a first image captured by the image-capturing unit 10, identifies a position of an object to be imaged. As described above, the first image is an image including a target area that the image-capturing control unit 23, by setting an exposure period of the image-capturing unit 10 within an expected light-off period calculated by the calculation unit 22, makes the image-capturing unit 10 capture within the expected light-off period.

Since the configuration of the image generation control device 30 enables a position of an object to be imaged to be identified by use of a target area image that is not influenced by backlight, it is possible to improve identification precision.

In addition, in the image generation control device 30, the object position identification unit 34 makes the illumination unit 40 radiate illuminating light toward the identified position of the object to be imaged at a timing synchronized with an exposure period and makes the image-capturing unit 10 capture an image of the identified position of the object to be imaged during the exposure period set within an expected light-off period. That is, the image generation control device 30 can also be referred to as an image-capturing control device.

The configuration of the image generation control device 30 enables a sharper image of an object to be imaged to be captured. That is, it is possible to generate an image of the object to be imaged with high precision.

In addition, in the image generation control device 30, the image generation unit 36 generates a synthetic image into which an object-to-be-imaged image and a wide area image are synthesized with each other.

Since the configuration of the image generation control device 30 enables a synthetic image including not only an image of an object to be imaged but also an image of a vicinity of the object to be imaged to be generated, it is possible to provide an image from which variety of information can be acquired and that is highly convenient for users.

Third Embodiment

A third embodiment relates to an embodiment that makes an image-capturing unit perform exposure during a plurality of exposure periods and capture one first image. Note that, since the basic configurations of an image-capturing apparatus and image generation control device of the third embodiment are the same as those of the image-capturing apparatus 2 and image generation control device 30 of the second embodiment, description will be made with reference to FIG. 2.

In an image generation control device 30 of the third embodiment, an image-capturing control unit 35 makes an image-capturing unit 10 perform exposure during a plurality of exposure periods that respectively correspond to a plurality of expected light-off periods and capture one first image.

Figure 6:
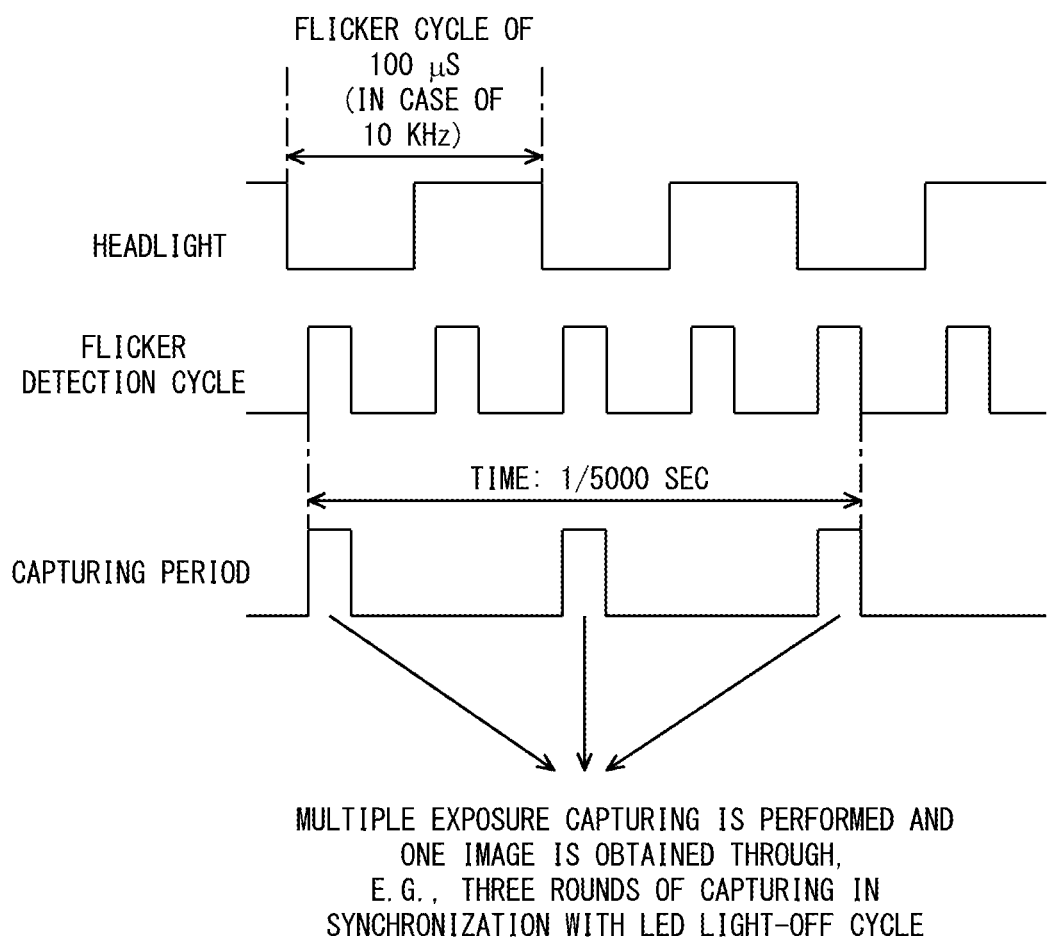
FIG. 6 is a diagram provided for description of multiple exposure in a third embodiment.

For example, as illustrated in FIG. 6, the image-capturing control unit 35 makes the image-capturing unit 10 perform exposure during three exposure periods and capture one first image. For example, as illustrated in FIG. 6, when a flicker cycle of headlights, which is an imaging-hindering light source, is 10 KHz and a duty ratio of light-on and light-off is 50%, time required for three rounds of image capturing is 200 µs in total. Movement of a subject during the period of 200 µs is the same as that in image capturing with shutter speed set at ⅕₀₀₀ seconds. Since, as described above, capturing of one first image through three rounds of image capturing is sufficiently high-speed image capturing, the amount of movement of a vehicle with a license plate, which is an object to be imaged, during the capturing period is negligible even when the vehicle is traveling, enabling an image without blur to be obtained. FIG. 6 is a diagram provided for description of multiple exposure in the third embodiment.

As described thus far, according to the third embodiment, in the image generation control device 30, the image-capturing control unit 35 makes the image-capturing unit 10 perform exposure during a plurality of exposure periods that respectively correspond to a plurality of expected light-off periods and capture one first image.

The image generation control device 30 enables image capturing provided with a sufficient amount of light to be performed even when an image is captured within an expected light-off period.

Note that, although, in FIG. 6, the image-capturing control unit 35 makes the image-capturing unit 10 perform exposure during a plurality of exposure periods that respectively correspond to a plurality of consecutive expected light-off periods and capture one first image, the present embodiment is not limited to the configuration and the image-capturing control unit 35 may make the image-capturing unit 10 perform exposure during a plurality of exposure periods that respectively correspond to a plurality of non-consecutive expected light-off periods and capture one first image.

Fourth Embodiment

A fourth embodiment relates to processing when an expected light-off period cannot be calculated through one round of calculation processing. Note that, since the basic configurations of an image-capturing apparatus and image generation control device of the fourth embodiment are the same as those of the image-capturing apparatus 2 and image generation control device 30 of the second embodiment, description will be made with reference to FIG. 2.

In an image generation control device 30 of the fourth embodiment, when a calculation unit 22 cannot calculate an expected light-off period, an image-capturing control unit 35 adjusts a first set value, which is set in an image-capturing unit 10, in such a way that an imaging frame rate is raised. In the adjustment of the first set value, for example, a value obtained by adding a predetermined value to a first set value that is currently set may be set as a first set value after adjustment or a value obtained by increasing a first set value that is currently set at a predetermined rate may be set as a first set value after adjustment. In the above processing, the case where the calculation unit 22 cannot calculate an expected light-off period is, for example, a case where no second image the total luminance of which becomes less than a determination threshold value Th appears.

Figure 7:
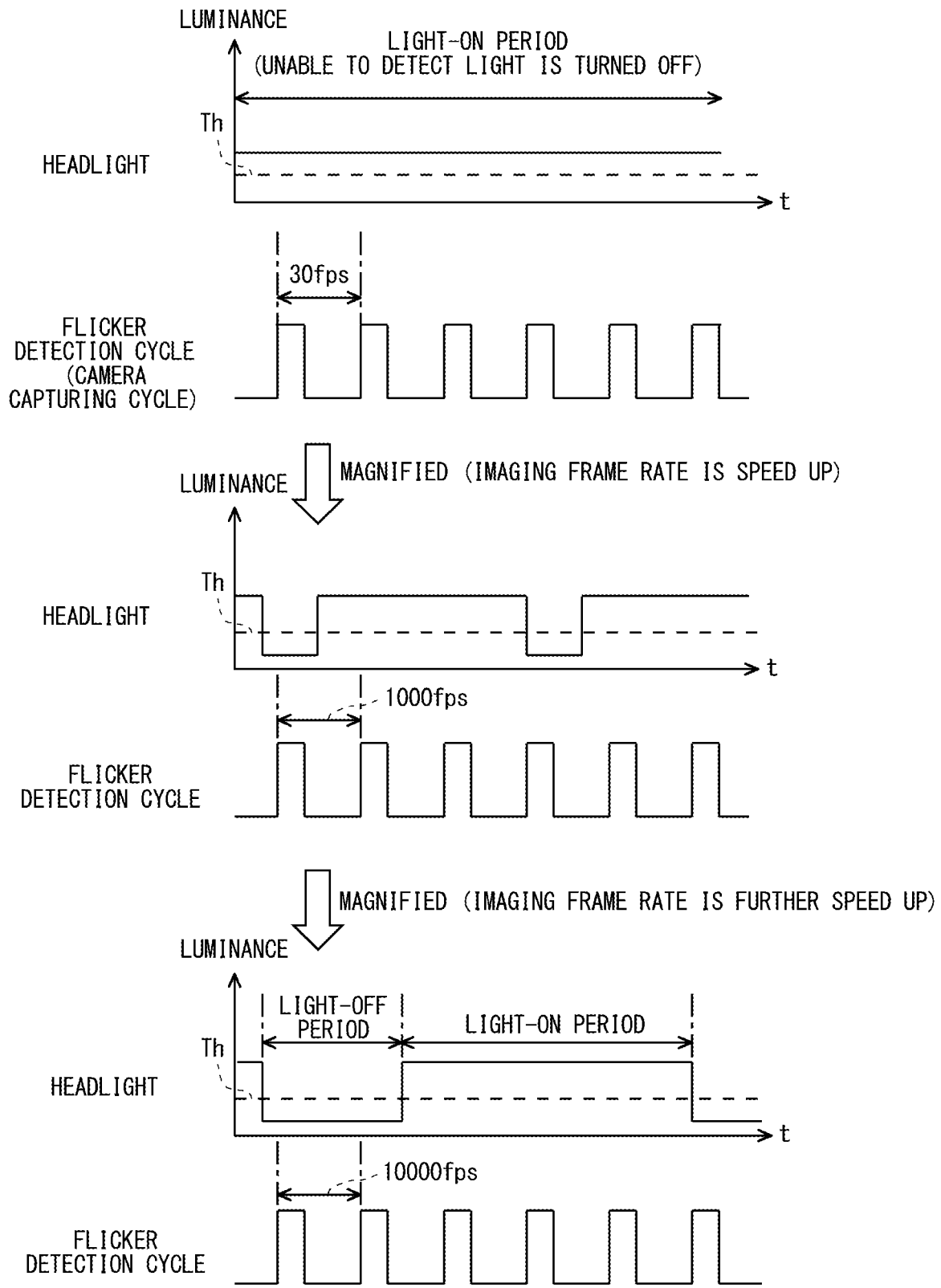
FIG. 7 is a diagram provided for description of calculation processing of an expected light-off period in a fourth embodiment.

For example, in the top row in FIG. 7, a calculation result of a light-on period and a light-off period when the flicker cycle of headlights that is an imaging-hindering light source is 10 KHz and an imaging frame rate is 30 fps is illustrated. In this case, since the imaging frame rate is slow with respect to the flicker cycle, luminance of each second image becomes equal to or greater than the determination threshold value Th and all periods are thus determined to be light-on periods. That is, in this case, the calculation unit 22 determines that no expected light-off period can be calculated and outputs a calculation impossibility notification to the image-capturing control unit 35.

In the middle row in FIG. 7, a calculation result of a light-on period and a light-off period when the flicker cycle of the headlights, which is an imaging-hindering light source, is 10 KHz and the imaging frame rate is 1000 fps is illustrated. In this case, although not accurate, an expected light-off period can be calculated.

Further, in the bottom row in FIG. 7, a calculation result of a light-on period and a light-off period when the flicker cycle of the headlights, which is an imaging-hindering light source, is 10 KHz and the imaging frame rate is 10000 fps is illustrated. In this case, a fairly accurate expected light-off period can be calculated. Note that it can be calculated that, when the flicker cycle of the headlights, which is an imaging-hindering light source, is 10 KHz and a duty ratio of light-on and light-off is 50%, image capturing at an imaging frame rate of 20000 fps enables images repeating light-on and light-off to be captured. If image capturing at an imaging frame rate of as high as 100000 fps can be performed, it becomes possible to measure a light-off period and a light-on period with higher accuracy.

The calculation unit 22 calculates an expected light-off period again based on a plurality of second images including a target area, which are captured by the image-capturing unit 10, based on the adjusted first set value.

As described above, according to the fourth embodiment, in the image generation control device 30, when the calculation unit 22 cannot calculate an expected light-off period, the image-capturing control unit 35 adjusts the first set value, which is set in the image-capturing unit 10, in such a way that the imaging frame rate is raised. The calculation unit 22 calculates an expected light-off period again based on a plurality of second images including a target area, which are captured by the image-capturing unit 10, based on the adjusted first set value.

Even when a first set value that is set by default is small with respect to a flicker cycle of an imaging-hindering light source, the configuration of the image generation control device 30 enables an expected light-off period to be surely calculated through adjustment of the first set value in such a way that the imaging frame rate is raised.

Other Embodiments (1) Although, in the above-described first to fourth embodiments, the description was made assuming that the calculation unit 22 calculates an expected light-off period during which an imaging-hindering light source is turned off, based on a plurality of second images captured by the image-capturing unit 10, the present invention is not limited to the configuration. For example, the image-capturing apparatuses 1 and 2 may further include a light receiving element and the calculation unit 22 may calculate an expected light-off period, based on luminance variation within a target area, the luminance variation being detected by the light receiving element. Essentially, in the image generation control devices 20 and 30, the calculation unit 22 may only calculate an expected light-off period, based on luminance variation within a target area. The image-capturing control unit 23 may only set an exposure period of the image-capturing unit 10 within the expected light-off period calculated by the calculation unit 22 and make the image-capturing unit 10 capture an image including the target area within the expected light-off period.

(2) Although, in the above-described first to fourth embodiments, the description was made assuming that a "target area image (that is, a first image or a second image)" is an image smaller than a "wide area image", that is, an image into which a portion of a "wide area image" is cut out, the present invention is not limited to the configuration and a "target area image" may be identical to a "wide area image".

(3) The image-capturing apparatuses 1 and 2, which were described in the above-described first to fourth embodiments, can be used for, for example, a monitoring apparatus in a road traffic monitoring system or a drive recorder.

Figure 8:
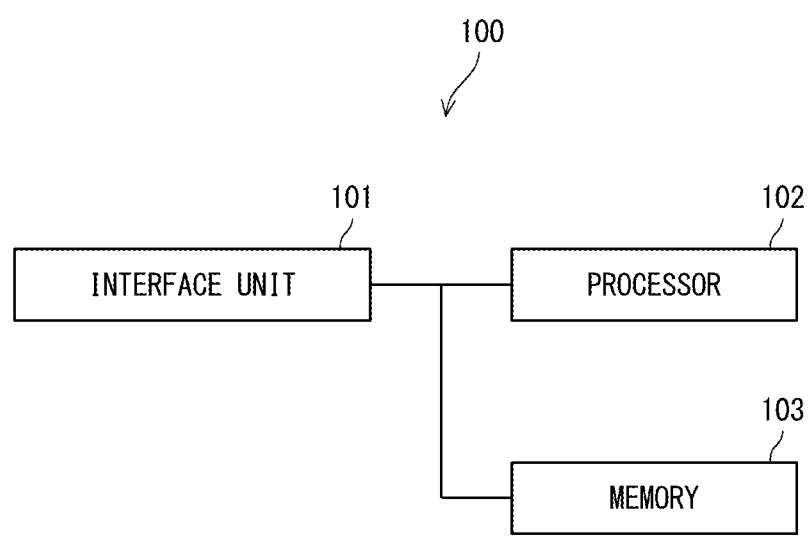
FIG. 8 is a diagram illustrating a hardware configuration example of the image generation control devices.

(4) FIG. 8 is a diagram illustrating a hardware configuration example of an image generation control device. In FIG. 8, an image generation control device 100 includes an interface unit 101, a processor 102, and a memory 103.

The acquisition units 21 and 31 of the image generation control devices 20 and 30, which were described in the first to fourth embodiments and the other embodiment (1), are achieved by the interface unit 101. In addition, the calculation units 22, moving-body image area identification unit 32, setting unit 33, object position identification unit 34, image-capturing control units 23 and 35, and image generation unit 36 of the image generation control devices 20 and 30 are achieved by the processor 102 reading and executing programs stored in the memory 103.

The present embodiment enables an image generation control device, an image generation control method, and an image generation control program that are capable of generating an image of an object to be imaged positioned in a vicinity of an imaging-hindering light source with high precision to be provided.

It should be noted that the present invention is not limited to the above-described embodiments and can be appropriately modified as long as the modification does not deviate from the scope of the present embodiment.

What is claimed is:

1. An image generation control device configured to generate an image of an object to be imaged positioned in a vicinity of an imaging-hindering light source flickering on and off cyclically, the image generation control device comprising:
    a memory configured to store a program; and
    a processor coupled to the memory and configured to execute the program stored in the memory to:
        calculate, based on luminance variation within a target area including the imaging-hindering light source and the object to be imaged, an expected light-off period during which the imaging-hindering light source is turned off; and
        by setting an exposure period of an image-capturing unit within the calculated expected light-off period, make the image-capturing unit capture a first image including the target area within the calculated expected light-off period,
    wherein the processor is further configured to make the image-capturing unit perform exposure during a plurality of the exposure periods that respectively correspond to a plurality of the expected light-off periods and capture one first image comprising the plurality of exposure periods,
    wherein the processor is configured to calculate an expected light-off period during which the imaging-hindering light source is turned off, based on a plurality of second images including the target area, the second images being captured in a plurality of captured frames by the image-capturing unit when a set value of an imaging frame rate is a first set value, wherein, when the processor cannot calculate the expected light-off period, the processor is configured to adjust the first set value in such a way that the imaging frame rate is raised, and wherein the processor calculates the expected light-off period again based on a plurality of second images including the target area that are captured by the image-capturing unit, based on the adjusted first set value.

2. The image generation control device according to claim 1, wherein the processor is further configured to:
identify an image area corresponding to at least a portion of a moving object, using a plurality of wide area images that are captured in a plurality of captured frames by the image-capturing unit, that include the target area, and areas of which are wider than the target area; and
set the target area, based on the identified image area.

3. The image generation control device according to claim 1, wherein the processor is further configured to identify a position of the object to be imaged, using the captured first image.

4. The image generation control device according to claim 3, wherein the processor is further configured to make a light source radiate illuminating light to the identified position of the object to be imaged at a timing synchronized with the exposure period and makes the image-capturing unit capture an image of the identified position of the object to be imaged during the exposure period set within the expected light-off period.

5. The image generation control device according to claim 1, wherein the processor is further configured to generate a synthetic image into which an image of the object to be imaged and a wide area image that includes the target area and the area of which is wider than the target area are synthesized with each other.

6. An image generation control method configured to generate an image of an object to be imaged positioned in a vicinity of an imaging-hindering light source flickering on and off cyclically, the image generation control method comprising:
calculating, based on luminance variation within a target area including the imaging-hindering light source and the object to be imaged, an expected light-off period during which the imaging-hindering light source is turned off; and
by setting an exposure period of an image-capturing unit within the calculated expected light-off period, making the image-capturing unit capture an image including the target area within the calculated expected light-off period and perform exposure during a plurality of the exposure periods that respectively correspond to a plurality of the expected light-off periods and capture one first image comprising the plurality of exposure periods, wherein the calculating includes making the image-capturing unit perform exposure during a plurality of the exposure periods that respectively correspond to a plurality of the expected light-off periods and capture one first image comprising the plurality of exposure periods, and wherein the image generation control method further comprises adjusting a first set value in such a way that the imaging frame rate is raised when the expected light-off period cannot be calculated and calculating the expected light-off period again based on a plurality of second images including the target area that are captured by the image-capturing unit, based on the adjusted first set value.

7. A non-transitory computer readable medium storing an image generation control program causing an image generation control device configured to generate an image of an object to be imaged positioned in a vicinity of an imaging-hindering light source flickering on and off cyclically to execute processing comprising:
calculating, based on luminance variation within a target area including the imaging-hindering light source and the object to be imaged, an expected light-off period during which the imaging-hindering light source is turned off; and
by setting an exposure period of an image-capturing unit within the calculated expected light-off period, making the image-capturing unit capture an image including the target area within the calculated expected light-off period and perform exposure during a plurality of the exposure periods that respectively correspond to a plurality of the expected light-off periods and capture one first image comprising the plurality of exposure periods, wherein the calculating includes making the image-capturing unit perform exposure during a plurality of the exposure periods that respectively correspond to a plurality of the expected light-off periods and capture one first image comprising the plurality of exposure periods, and wherein the processing further comprises adjusting a first set value in such a way that the imaging frame rate is raised when the expected light-off period cannot be calculated and calculating the expected light-off period again based on a plurality of second images including the target area that are captured by the image-capturing unit, based on the adjusted first set value.

* * * * *